United States Patent [19]
Chung

[11] Patent Number: 5,750,203
[45] Date of Patent: May 12, 1998

[54] METHOD OF PREPARING ORGANICALLY MODIFIED ALUMINOSILCATES SOL-GEL FILMS

[75] Inventor: Young Chung, Calabasas, Calif.

[73] Assignee: Rockwell International Corp., Seal Beach, Calif.

[21] Appl. No.: 524,978

[22] Filed: Sep. 7, 1995

[51] Int. Cl.$^6$ ..................................................... B05D 3/02
[52] U.S. Cl. ...................... 427/380; 427/387; 427/389.7; 427/397.7; 501/12; 252/308; 252/315.2; 252/315.4
[58] Field of Search ............................... 252/308, 315.2, 252/315.4; 501/12; 427/379, 380, 387, 389.7, 397.7

[56] References Cited

U.S. PATENT DOCUMENTS

| | | | |
|---|---|---|---|
| 3,141,990 | 7/1964 | Ray et al. | 313/221 |
| 4,791,009 | 12/1988 | Arakawa et al. | 427/64 |
| 4,806,389 | 2/1989 | Peters et al. | 427/67 |
| 4,923,425 | 5/1990 | Ford | 445/58 |
| 4,946,707 | 8/1990 | Kasenge et al. | 427/64 |
| 4,952,422 | 8/1990 | Pappalardo et al. | 427/67 |
| 4,979,893 | 12/1990 | Pappalardo et al. | 427/67 |
| 5,126,166 | 6/1992 | Dutta et al. | 427/67 |
| 5,196,229 | 3/1993 | Chau | 427/67 |
| 5,200,233 | 4/1993 | Mohacsi | 427/67 |
| 5,395,954 | 3/1995 | Soria et al. | 536/10 |

FOREIGN PATENT DOCUMENTS

| | | |
|---|---|---|
| 44-12273 | 6/1969 | Japan. |
| 44-12274 | 6/1969 | Japan. |
| 54-124582 | 9/1979 | Japan. |
| 55-056335 | 4/1980 | Japan. |
| 55-53055 | 4/1980 | Japan. |

OTHER PUBLICATIONS

"Sol–Gel Processing of Complex Oxide Films", Yi et al, Ceramic Bulletin, 70(7), pp. 1173–1179.

Publication by Carol Ashley & Scott Reed, in *Manufacturing Technology*, pp. 5–6, dated Nov. 1992, entitled "Sol–gel Processing of Tailored Thin Films".

Primary Examiner—Michael Lusignan
Assistant Examiner—Erma Cameron
Attorney, Agent, or Firm—John D. Veldhuis-Kroeze; Gregory G. Williams; George A. Montanye

[57] ABSTRACT

An organically modified sol-gel method of preparing substantially crack-free aluminosilicates films is provided. Chelated aluminum alkoxide and polydimethylsiloxane are mixed in a 1:1 ratio by weight in a solvent and refluxed at approximately the boiling temperature of the solvent to produce a sol-gel liquid including polymerized aluminosilicates. The sol-gel liquid is cooled to room temperature. Additional solvent is added to the sol-gel liquid to reduce its viscosity. A substrate is coated with the reduced viscosity sol-gel liquid. The coating of sol-gel liquid on the substrate is dried to produce an organically modified aluminosilicates sol-gel film. The sol-gel film is heated, to enhance polymerization of the sol-gel film and to evaporate residual solvent, and then cooled.

14 Claims, 2 Drawing Sheets

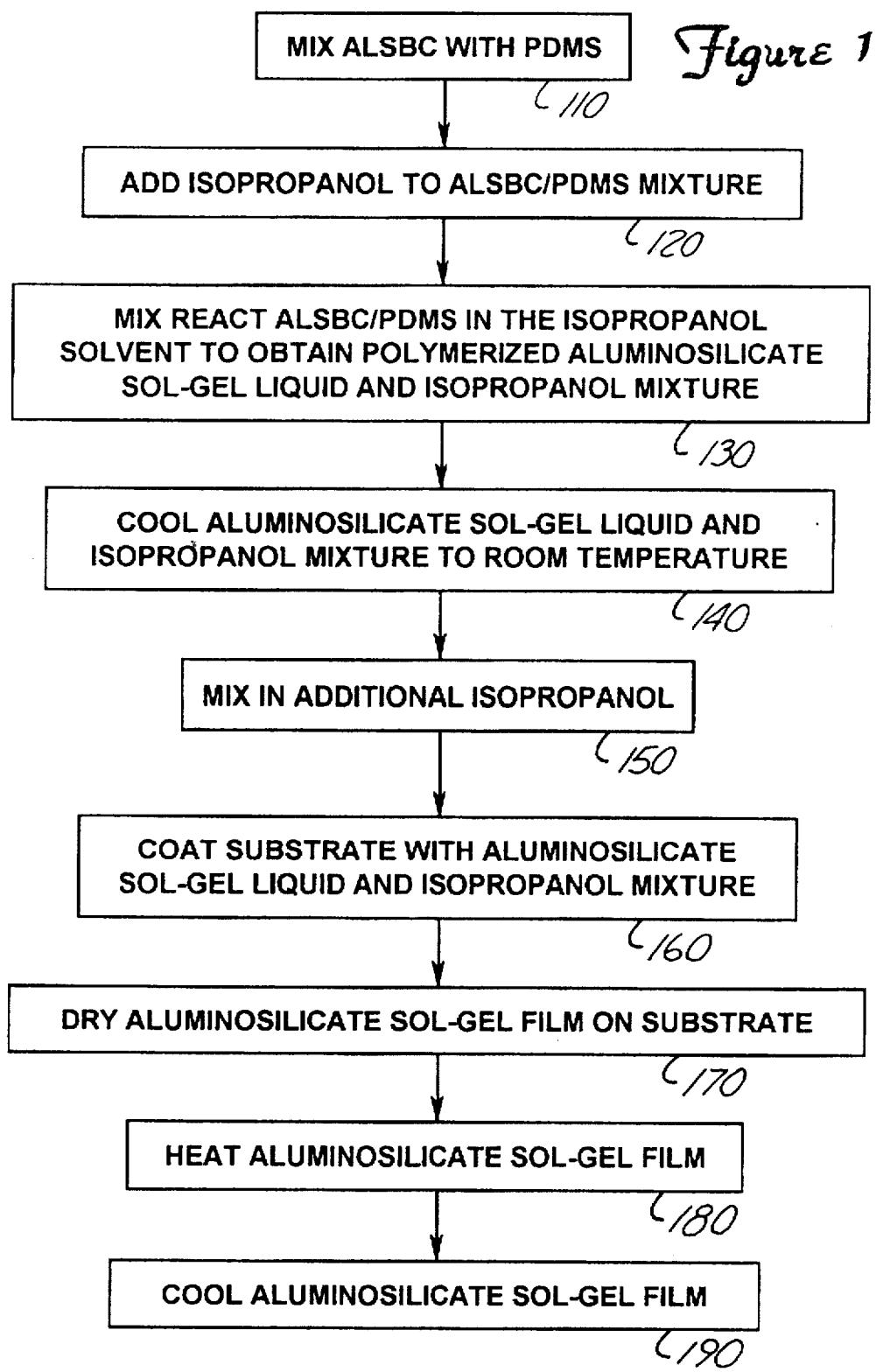

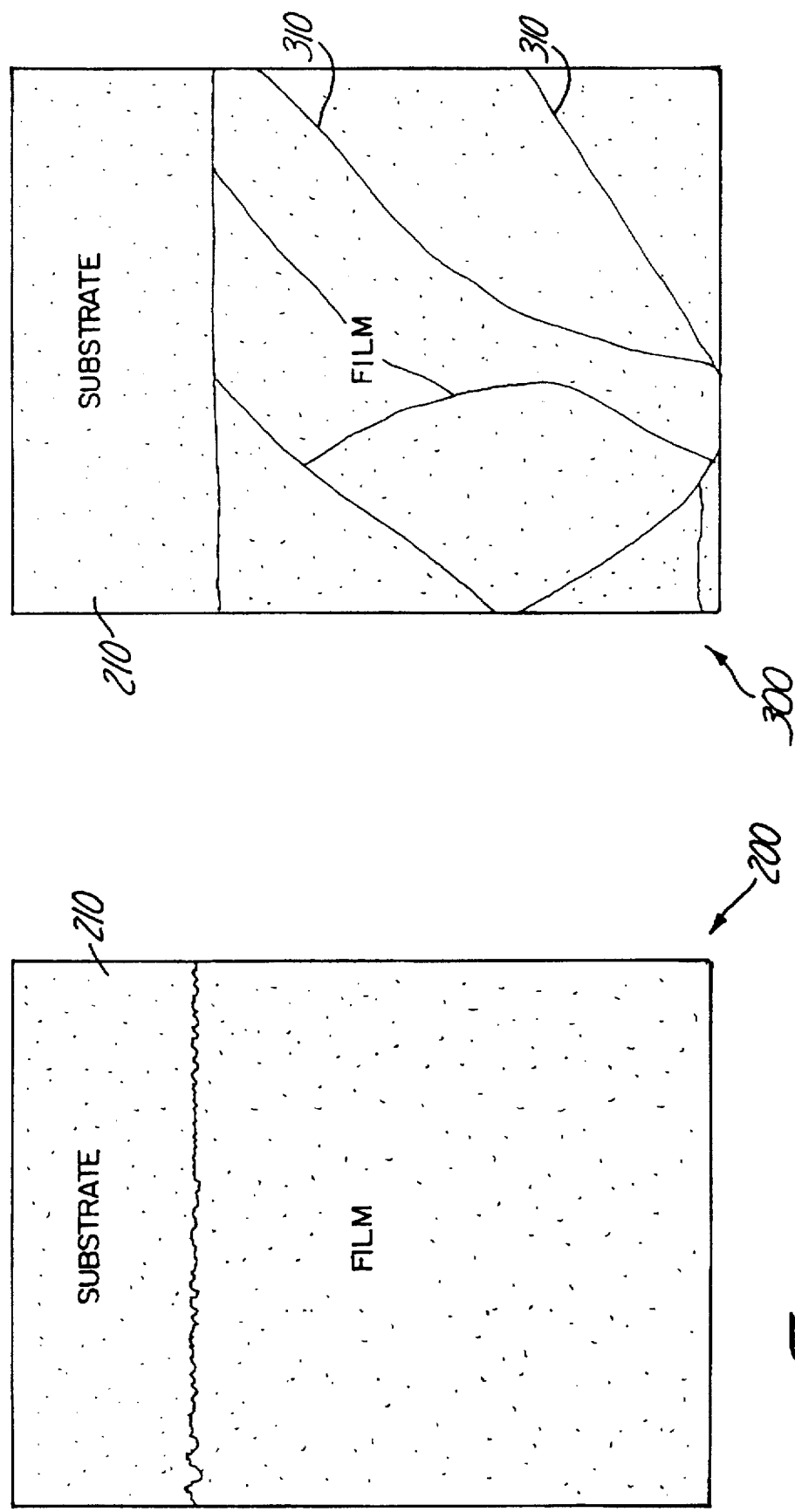

METHOD OF PREPARING ORGANICALLY MODIFIED ALUMINOSILCATES SOL-GEL FILMS

CROSS REFERENCES TO RELATED APPLICATIONS

The following U.S. patents and co-pending U.S. patent applications are herein incorporated by reference: U.S. Pat. No. 5,196,229 entitled "Coated Phosphor Articles"; co-pending and commonly assigned U.S. patent application Ser. No. 92CR178/JVK of Chung et al entitled "Use of Sol-Gel Materials As Phosphor Carrier In Fabrication of Fluorescent Lamps"; and co-pending and commonly assigned U.S. patent application Ser. No. 95CR041/JVK of Shaw entitled "Avionics Grade Fluorescent Lamp Resistant to Lumen Depreciation."

BACKGROUND OF THE INVENTION

The present invention is related to methods of preparing sol-gel films, and more particularly, to a method of preparing an organically modified aluminosilicate sol-gel film which is substantially crack-free.

Sol-gel processes have been used to coat thin films of glasses and ceramics on various types of substrates for a variety of purposes. Frequently, sol-gel materials and/or films are used to facilitate enhanced performance of another material or to protect another material from harsh environmental conditions. For instance, some sol-gel materials have been used to coat phosphor particles to enhance luminance of fluorescent lamps. As an example, the use of a particular type of sol-gel material is discussed in Chau's U.S. Pat. No. 5,196,229 entitled "Coated Phosphor Articles" and assigned to GTE Products Corporation.

Cracking of sol-gel films during drying and firing is a serious problem with prior art sol-gel processes and formulations. Most sol-gel films experience severe cracking when deposited in a layer no more than about 0.05 µ thick. Substantially thicker sol-gel films experience even more cracking. Sol-gel films which crack during their formation frequently do not serve as sufficient barriers to the various hostile environments such as oxidation, corrosion, abrasion and ion bombardment environments. As a specific example, many sol-gel films which exhibit excessive cracking do not provide sufficient protection of phosphor particles in fluorescent lamps to prevent the phosphor particles from being damaged by bombardment of mercury ions while the lamp is in use. The result is that lumen depreciation caused by damaged phosphor particles is typically not effectively prevented or sufficiently postponed. Existing techniques for producing reduced crack sol-gel films are undesirable because they require that only very thinly layered films (typically no thicker than 0.05 µm to 0.06 µm) be produced to control cracking. Further, these prior art sol-gel films are created under closely controlled and very gradual increases and decreases in temperature during heating and cooling steps of the process. The processes for making these prior art sol-gel films are thus frequently difficult to use in a large scale manufacturing environment. Therefore, there is a need for a sol-gel process which results in substantially crack-free sol-gel films having a thickness far in excess of 0.06 µ.

SUMMARY OF THE INVENTION

It is an object of the present invention to provide a sol-gel process which results in substantially crack-free aluminosilicates sol-gel films. It is a second object of the present invention to provide a sol-gel process for producing organically modified aluminosilicates sol-gel films having minimal cracking when deposited in layers in excess of 0.06 µ thick.

With the present invention, an organically modified sol-gel method of preparing substantially crack-free aluminosilicates films is provided. Chelated aluminum alkoxide and polydimethylsiloxane are mixed in a 1:1 ratio by weight in a solvent and refluxed at approximately the boiling temperature of the solvent to produce a sol-gel liquid including polymerized aluminosilicates. The sol-gel liquid is cooled to room temperature. Additional solvent is added to the sol-gel liquid to reduce its viscosity. A substrate is coated with the reduced viscosity sol-gel liquid. The coating of sol-gel liquid on the substrate is dried to produce an organically modified aluminosilicates sol-gel film. The sol-gel film is heated, to enhance polymerization of the sol-gel film and to evaporate residual solvent, and then cooled.

BRIEF DESCRIPTION OF THE DRAWINGS

The invention may be more fully understood by reading the following description of preferred embodiments of the invention in conjunction with the appended drawings wherein:

FIG. 1 is a flow diagram illustrating a first preferred embodiment of the present invention;

FIG. 2 is a side view of a portion of a substantially crack-free aluminosilcates film prepared with the organically modified sol-gel process of the present invention; and FIG. 3 is a side view of a prior art sol-gel film prepared by a conventional sol-gel process which illustrates substantial cracking of even very thin sol-gel films.

DETAILED DESCRIPTION OF THE PREFERRED EMBODIMENTS

The present invention is a process of preparing substantially crack-free aluminosilicates films. According to the process, chelated aluminum alkoxide and polydimethylsiloxane oligomer are mixed in an alcoholic solvent and refluxed at the boiling temperature. The partial condensation occurring during reflux and the nature of the organic side groups of the modified precursors provide precise control over the gelation process. After withdrawal of a dip-coated sample from the coating solution, unreacted alkoxy groups in the film react with atmospheric moisture to complete the hydrolysis and condensation processes. In sum, this uniquely modified sol-gel reaction enables relief of the stress imposed on the films during drying. The dried film is then heated in a furnace to 400° C. and held at this temperature for at least about one hour to combust and remove remaining organics and to sinter the film. The process of the present invention is discussed in more detail below with reference to the flow diagram of FIG. 1.

FIG. 1 is a flow diagram illustrating the preferred method of producing substantially crack-free aluminosilicates films. The preferred method of the present invention provides a process for producing aluminosilicates and/or aluminosilicates oxide sol-gel films having minimal cracking at thicknesses far in excess of 0.06 µ. The steps of the process are as follows:

Step 110: Mix or combine an aluminum alkoxide with a silicone oligomer. The aluminum alkoxide is preferably aluminum di (sec-butoxide) acetoacetic ester chelate (Al $(OC_4H_9)_2(C_6H_9O_3)$). The silicone oligomer is preferably silanol terminated polydimethylsiloxane ($[SiO(CH_3)_2]_{22}$ $[OH]_2$). The aluminum di (sec-butoxide) acetoacetic ester chelate (hereinafter ALSBC) and the silanol terminated polydimethylsiloxane (hereinafter PDMS) are combined in a 1 to 1 weight ratio. Alternatively stated, ALSBC and PDMS are combined or mixed in a 5.8 to 1 mole ratio.

Step 120: Add organic solvent to the ALSBC\PDMS mixture. In preferred embodiments, the organic solvent is isopropanol and is mixed in a volume ratio of 1 part isopropanol to 2 parts ALSBC\PDMS mixture. Steps 110 and 120 can be combined into a single step if desired. The ALSBC\PDMS and isopropanol are preferably combined at room temperature.

Step 130: Mix\react the ALSBC\PDMS in the isopropanol solvent to facilitate the sol-gel reaction and reflux at approximately the boiling temperature of the isopropanol. In preferred embodiments, the ALSBC\PDMS and isopropanol are mixed at approximately 80° C. (±3° C.) for about 30 minutes. The result of step 130 is a mixture of isopropanol solvent and at least partially polymerized aluminosilicate sol-gel. Equation 1 and 2 describe two of the many possible aluminosilicates sol-gels which may formed at this point.

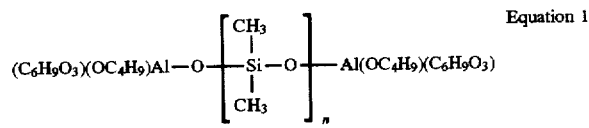

Equation 1

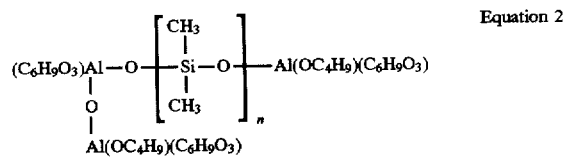

Equation 2

Step 140: Cool the aluminosilicate sol-gel and isopropanol mixture to room temperature. The rate of cooling is not particularly important and can vary widely to accommodate a manufacturing setting. The result of step 140 is a viscous liquid containing isopropanol and partially polymerized aluminosilicate sol-gel.

Step 150: Mix in additional isopropanol solvent to the viscous isopropanol and aluminosilicate sol-gel mixture to reduce the viscosity of the mixture. In preferred embodiments, the additional isopropanol is added in a volume ratio of approximately 4 parts isopropanol to 1 part aluminosilicate sol-gel and isopropanol mixture. The mixing time for step 150 is not particularly important. However, longer mix times are preferred and one hour is a typical mix time.

Step 160: Coat the desired substrate with the reduced viscosity aluminosilicate sol-gel and isopropanol mixture by any conventional coating process. A typical contemplated substrate is a fluorescent lamp's glass tube and phosphor coating. Preferred coating processes include spin and dip coating processes, with dip coating being preferred if the substrate is not a flat substrate. The substrate should be coated with the mixture to form a coating of the desired thickness. Sol-Gel coatings in excess of 2.0 µm can be made without resulting in cracks.

Step 170: Dry the aluminosilicate sol-gel and isopropanol mixture on the substrate at room temperature to evaporate at least a portion of the isopropanol solvent and to produce a substantially crack-free organically modified aluminosilicate sol-gel film on the substrate. The drying time can vary, but is typically about one hour. It is believed that the elastomeric organic groups in the aluminosilicate sol-gel aid in preventing or minimizing cracking during the drying process.

Step 180: Heat the organically modified aluminosilicate sol-gel film to enhance polymerization and to harden the film. Remaining organics are combusted and removed while the film is sintered. In preferred embodiments, the organically modified aluminosilicate sol-gel film is heated to about 400° C. by increasing the temperature by about 3° C. per minute. Once 400° C. is achieved, the temperature is maintained at 400° C. for at least one hour, but preferably about 5 hours to complete polymerization and to help to evaporate residual solvents.

It must be noted that the 400° C. temperature is not critical for preparing the aluminosilicate sol-gel film, but rather, is chosen so as to not damage the substrate (which in some preferred embodiments is contemplated to be a phosphor coated glass lamp). Higher temperatures are more preferable than lower temperatures. Therefore, in other embodiments, the temperature is chosen according to temperature limits of the substrate, but such that it is as high as 1000° C. The resulting sol-gel film in these other embodiments will have excellent properties and will remain substantially crack-free. When heating the sol-gel film to only 400° C., some residual organic groups from the PDMS will typically remain in the film. If desired in other embodiments, it is contemplated that heating the sol-gel film to about 600° C. for a sufficient period of time will cause all of the organic groups to oxidize and burned off, resulting in a pure aluminosilicate oxide.

Step 190: Cool the aluminosilicate sol-gel film to room temperature. The rate of cooling is not particularly important. In preferred embodiments, the source of heat is turned off and the sol-gel film is simply allowed to cool on its own. However, the rate of cooling can be increased or decreased considerably without causing substantial cracking in the sol-gel film. The result of this step is a hardened organically modified aluminosilicate sol-gel film or a hardened aluminosilicate oxide sol-gel film, depending on whether and to what extent the organic groups have been oxidized. In either case, the aluminosilicate film is substantially crack-free.

EXAMPLE

Two aluminosilicate sol-gel films were deposited on glass substrates in order to compare a conventional sol-gel process to the organically modified sol-gel process of the present invention. The first sol-gel film was made from a sol-gel solution according to the present invention having aluminum alkoxide and silanol terminated polydimethylsiloxane in isopropanol as described above with reference to FIG. 1. First sol-gel film 200 is illustrated in FIG. 2. The second sol-gel film was made from a solution prepared by mixing aluminum alkoxide and tetraethoxylsilane in isopropanol at room temperature. Second sol-gel film 300 is illustrated in FIG. 3. Both film 200 and film 300 were deposited on substrates 210 made of soda lime glass by spin coating at different speeds to vary the film thicknesses. Both film 200 and film 300 were then heated at 400° for one hour, followed by furnace cooling to room temperature.

Both films were studied with an optical microscope to observe the presence of cracks. Parts of the films deposited on the substrates were removed to measure film thickness by the Dektak method. As can be seen in FIG. 2, sol-gel film 200 prepared by the organically modified sol-gel process of the present invention is substantially crack-free. The thickness of substantially crack-free film 200 shown in FIG. 2 is 2 µm. In contrast, conventionally prepared sol-gel film 300 shown in FIG. 3 exhibits substantial cracking. Cracks 310 formed even though the thickness of film 300 shown in FIG. 3 is only 0.3 µm. Thus, the sol-gel process of the present invention enables the deposition of substantially crack-free aluminosilicates sol-gel films in excess of six times the thickness of most conventional sol-gel processes.

While particular embodiments of the present invention have been shown and described, it should be clear that changes and modifications may be made to such embodiments without departing from the true scope and spirit of the invention. It is intended that the appended claims cover all such changes and modifications.

I claim:

1. A method of preparing an aluminosilicate sol-gel film comprising:

mixing in a 1:1 ratio by weight, chelated aluminum alkoxide and polydimethylsiloxane, the aluminum alkoxide and polydimethylsiloxane being mixed in a solvent and refluxed at approximately the boiling temperature of the solvent to produce a sol-gel mixed with the solvent, the sol-gel including polymerized aluminosilicate;

cooling the sol-gel and solvent mixture to room temperature;

adding additional solvent to the sol-gel and solvent mixture to reduce the viscosity of the mixture;

coating a substrate with the reduced viscosity sol-gel and solvent mixture;

drying the sol-gel and solvent mixture on the substrate to evaporate at least a portion of the solvent and to produce an organically modified aluminosilicate sol-gel film on the substrate;

heating the sol-gel film; and cooling the sol-gel film.

2. The method of claim 1 wherein mixing in a 1:1 ratio by weight chelated aluminum alkoxide and polydimethylsiloxane comprises mixing the chelated aluminum alkoxide and polydimethylsiloxane in an alcohol solvent.

3. The method of claim 2 wherein mixing in a 1:1 ratio by weight chelated aluminum alkoxide and polydimethylsiloxane comprises mixing the chelated aluminum alkoxide and polydimethylsiloxane in isopropanol, the isopropanol being mixed in a ratio by volume of 1 part isopropanol to 2 parts chelated aluminum alkoxide and polydimethylsiloxane mixture.

4. The method of claim 3 wherein mixing the chelated aluminum alkoxide and polydimethylsiloxane in isopropanol further comprises mixing the chelated aluminum alkoxide and polydimethylsiloxane in isopropanol at approximately 80° C. for at least about 30 minutes.

5. The method of claim 1 wherein drying the sol-gel and solvent mixture on the substrate to evaporate at least a portion of the solvent and to produce a sol-gel film on the substrate comprises drying the sol-gel and solvent mixture on the substrate to produce a substantially crack-free organically modified aluminosilicate film on the substrate.

6. The method of claim 5 wherein drying the sol-gel and solvent mixture on the substrate to evaporate at least a portion of the solvent and to produce a sol-gel film on the substrate comprises drying the sol-gel and solvent mixture on the substrate at room temperature for at least about 1 hour.

7. The method of claim 1 wherein heating the sol-gel film comprises heating the sol-gel film to enhance polymerization of the sol-gel film.

8. The method of claim 1 wherein heating the sol-gel film comprises heating the sol-gel film to harden the sol-gel film.

9. The method of claim 1 wherein heating the sol-gel film comprises heating the sol-gel film to evaporate residual solvent.

10. The method of claim 1 wherein heating the sol-gel film comprises heating the sol-gel film to at least about 400° C. for at least about 1 hour.

11. The method of claim 10 wherein heating the sol-gel film further comprises heating the sol-gel film to about 400° C. for about 5 hours.

12. The method of claim 11 wherein heating the sol-gel film further comprises heating the sol-gel film to about 400° C. by raising the temperature of the sol-gel film by about 3° C. per minute to about 400° C. and maintaining the temperature at about 400° C. for about 5 hours.

13. A method of preparing an aluminosilicate sol-gel film on a substrate to minimize cracking of the aluminosilicate sol-gel film, the method comprising:

combining aluminum di (sec-butoxide) acetoacetic ester chelate (ALSBC) and silanol terminated polydimethylsiloxane (PDMS) in a 1:1 ratio by weight to produce an ALSBC\PDMS mixture;

adding isopropanol to the ALSBC\PDMS mixture in a volume ratio of 1 part isopropanol to 2 parts ALSBC\PDMS mixture;

mixing the ALSBC\PDMS mixture and isopropanol at approximately 80° C. for at least about 30 minutes to facilitate a reaction which results in production of aluminosilicate sol-gel, the isopropanol being refluxed during the mixing, the aluminosilicate sol-gel and isopropanol forming an aluminosilicate sol-gel and isopropanol mixture;

cooling the aluminosilicate sol-gel and isopropanol mixture to about room temperature;

adding additional isopropanol to the aluminosilicate sol-gel and isopropanol mixture to produce a reduced viscosity mixture, the additional isopropanol being added in a volume ratio of approximately 4 parts isopropanol to 1 part aluminosilicate sol-gel and isopropanol mixture;

coating the substrate with the reduced viscosity aluminosilicate sol-gel and isopropanol mixture;

drying the reduced viscosity aluminosilicate sol-gel and isopropanol mixture on the substrate to produce an organically modified substantially crack-free aluminosilicate sol-gel film on the substrate;

heating the organically modified substantially crack-free aluminosilicate sol-gel film to at least about 400° for at least about 1 hour to enhance polymerization of the substantially crack-free aluminosilicate sol-gel film; and cooling the substantially crack-free aluminosilicate sol-gel film.

14. The method of claim 13 wherein heating the organically modified substantially crack-free aluminosilicate sol-gel film further comprises heating the organically modified substantially crack-free aluminosilicate sol-gel film to at least about 400° C. by raising the temperature of the substantially crack-free aluminosilicate sol-gel film by about 3° C. per minute to at least about 400° C. and maintaining the temperature of the substantially crack-free aluminosilicate sol-gel film for about 5 hours.

* * * * *